United States Patent [19]
Post et al.

[11] 3,955,214
[45] May 4, 1976

[54] DEVICE FOR CLEANING THE MAGNETIC HEAD AND CAPSTAN ROLLER OF A CASSETTE-TYPE RECORDING AND/OR PLAYBACK UNIT IN RESPONSE TO OPERATION OF THE TAPE DRIVE OF THE UNIT

[75] Inventors: Herman D. Post, Great Neck; Jack Friedland, Floral Park; Art Seides, Jerico; George Alexandrovich, Sr., Commack, all of N.Y.

[73] Assignee: Tobins Industries Corporation, Commack, N.Y.

[22] Filed: Aug. 26, 1974

[21] Appl. No.: 500,666

[52] U.S. Cl. .............................. 360/128; 15/210 R; 360/137
[51] Int. Cl.² ...................... G11B 5/41; A47L 25/00
[58] Field of Search .......... 360/128, 137; 15/210 R, 15/100; 274/47

[56] References Cited
UNITED STATES PATENTS 3,069,815  12/1962  Valentine ........................ 15/210 R
3,439,922   4/1969  Howard ............................ 360/128
3,761,994  10/1973  Becht .................................. 274/47
3,783,470   1/1974  Myers et al. ...................... 274/47
3,789,452   2/1974  Nemoto ............................ 360/128

*Primary Examiner*—Robert S. Tupper
*Attorney, Agent, or Firm*—Michael J. Striker

[57] ABSTRACT

A cassette housing has an open side which faces the head and capstan roller of a tape recording and/or playback unit of the type using magnetic-tape cassettes, when the housing is placed in operative position on the unit in lieu of a tape cassette. One or more first pads are provided for wiping over the periphery of the capstan roller when the latter is rotated and a cam and follower arrangement driven by the tape drive of the unit performs oscillatory motions and wipes over the tape-engaging surface of the magnetic head of the unit.

7 Claims, 2 Drawing Figures

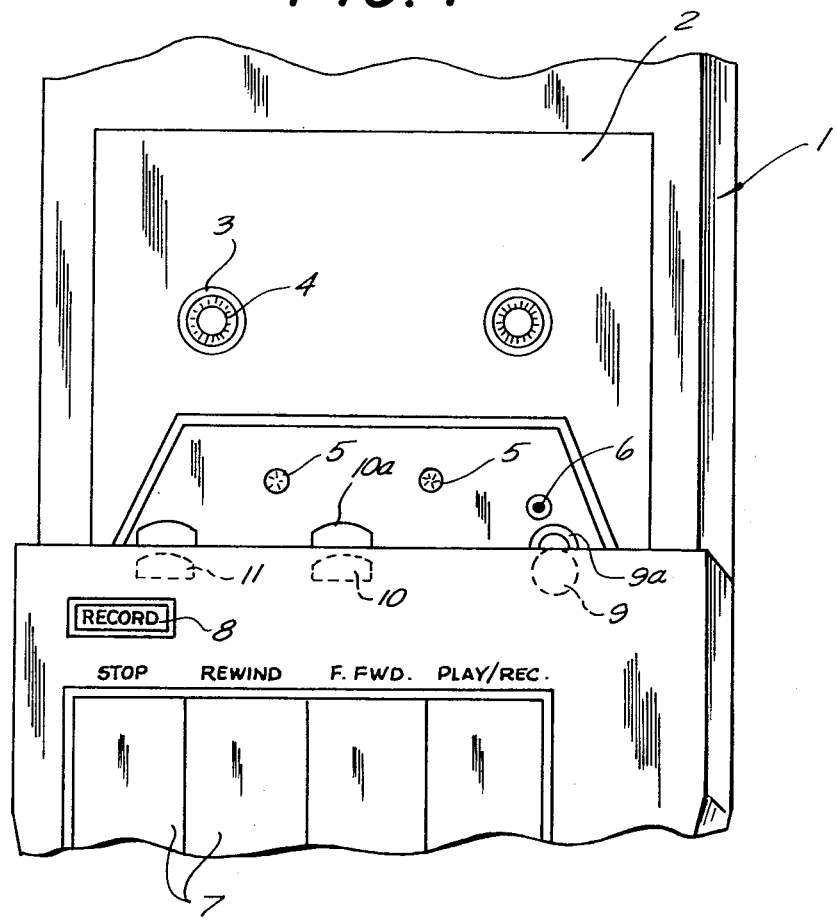
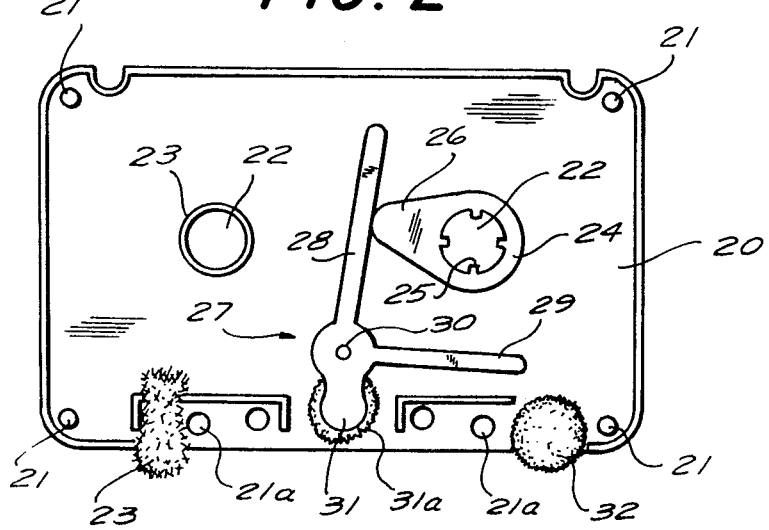

DEVICE FOR CLEANING THE MAGNETIC HEAD AND CAPSTAN ROLLER OF A CASSETTE-TYPE RECORDING AND/OR PLAYBACK UNIT IN RESPONSE TO OPERATION OF THE TAPE DRIVE OF THE UNIT

BACKGROUND OF THE INVENTION

The present invention relates generally to tape recorders, and more particularly to magnetic tape recorders of the type using cassette tapes. Still more specifically, the invention relates to a device for cleaning the magnetic head and the driven capstan roller of a tape recording and/or playback unit of the type using cassette tapes.

The type of magnetic-tape recording and/or playback unit which is by far the most popular at this stage of development in this field, is the one using cassette tapes according to the Philips system. Such cassette tapes have a housing which is placed into the cassette recording and/or playback unit, which will hereafter be called the unit for short, and which accommodates in its interior two hubs into which drive spindles of the unit extend through openings in the cassette housing. The tape is convoluted about one of the hubs and is connected at its opposite ends to the respective hubs so that, when the hub is rotated on which the tape is not yet convoluted, the tape will be withdrawn from the other hub and wound unto the first one. The tape is made to pass an open side of the cassette housing where it is engaged by a driven capstan roller to aid in its advancement, and where it is also in contact with a magnetic head for recording and/or playback purposes. The capstan roller and the magnetic head come in contact with the tape when the mechanism of the unit is placed either into "recording" or into "playback" mode.

All of this is very well known and is mentioned here merely by way of recapitulation.

The type of arrangement outlined above has found extremely wide acceptance throughout the world, and generally is very reliable and satisfactory. Prolbems do, however, occassionally occur, and perhaps the most common and annoying of these is improper recording and/or playback due to contamination of the tape-engaging surface of the magnetic head and of the periphery of the capstan roller. Over a period of time, the oxide material on the tape will leave a residue on the tape-engaging surface of the magnetic head, and also on the outer peripheral surface of the driven capstan roller, and this will cause — in the case of the head — improper recording and/or playback, and in the case of the capstan roller it will result in improper advancement of the tape.

While various approaches have been proposed to overcome these problems, none of the suggested solutions have been found to be particularly satisfactory, primarily because they have all been too complicated and not simple enough to use nor reliable enough in operation.

SUMMARY OF THE INVENTION

Accordingly, it is an object of the present invention to overcome the disadvantages of the prior art.

In particular, it is an object of this invention to provide a novel and improved device for cleaning the magnetic head and driven capstan roller of a cassette-type tape recording and/or playback unit having a tape drive.

An additional object of the invention is to provide such a device which is capable of polishing the magnetic head and cleaning the capstan roller at one and the same time.

A further object of the invention is to provide such a device which will carry out the desired cleaning functions in a brief period of time and with great reliability.

A further object of the invention is to provide such a device which is simple in its construction and very easy to use.

In keeping with these objects and with others which will become apparent hereafter, one feature of the invention resides in a device for cleaning the magnetic head and driven capstan roller of a cassette-type tape recording and/or playback unit having a tape drive. Briefly stated the device comprises a cassette housing having an open side which faces the head and capstan roller when the housing is placed in operative position on the unit in lieu of a tape cassette. First means is provided for wiping the periphery of the capstan roller in response to rotation of the latter. A second means is actuatable by the tape drive and is operative for wiping a tape-engaging surface of the magnetic head.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a fragmentary top-plan view of a tape recording and/or playback unit using tape cassettes; and FIG. 2 is a top-plan view of a device according to the present invention, for use in the unit of FIG. 1, and with the upper part of the housing removed for the purposes of illustration.

DESCRIPTION OF THE PREFERRED EMBODIMENTS

Referring firstly to FIG. 1, wherein a portion of a tape recording and/or playback unit has been illustrated of the type which uses tape cassettes, it will be seen that reference numeral 1 identifies the unit in toto. The housing of such unit is usually provided with an area or recess such as the one identified with reference numeral 2, wherein the tape cassette (not shown) is to be lodged. The tape cassette is placed into the area 2 and the housing of the tape cassette has two openings into which a pair of drive spindles 4 projects when the cassette is placed into the recess 2. The drive spindles 4 extend through holes 3 in the housing of the unit 1, and within the housing they are of course connected in suitable manner (which forms no part of this invention and is completely known per se) with the drive arrangement of the unit 1. A pair of locating pins 5 extend into respective holes formed in the tape cassette housing so as to hold the latter in place and locate it properly. When the tape cassette is so positioned, the open side of its housing will face the capstan roller 9, the recording and/or playback head 10 and the tape tensioning member 11 of the unit 1. These elements 9, 10 and 11 are shown in broken lines in the position which they assume when the unit is not in operation that is when it is not in "recording" or "playback" mode. These modes are selected by depressing the respective pushbuttons 7 which are appropriately labelled, or by operating some other control which may be provided in lieu of the pushbuttons 7. When the unit is to be used for recording on the tape, then it is usually necessary to depress simultaneously both the pushbutton 7 which is labelled "record" and an interlock button which is provided on most units capable of recording, in order to assure that accidental recording (and concomitant erasure of any previous material on the tape) is prevented. When the "play/record" button 7 is depressed, the elements 9, 10 and 11 are simultaneously moved (in a manner known per se) from their broken-line position to their full-line position in which they project into the open side of the cassette which is in place on the unit 1. In this position the member 11 engages the tape which passes along the open side, and tensions it, the head 10 also engages the tape to either record on or playback from the tape, and the capstan roller 9, which in conventional manner is provided with an outer coating 9a of rubber or synthetic plastic material, presses against the tape at exposed side thereof whereas a spindle 6 which extends through a further hole in the cassette housing is located behind the tape and serves as a back-up member for the capstan roller 9, so that the tape must pass through the nip between the spindle 6 and the capstan roller 9.

The unit 1 described above and its operation, are completely conventional. As pointed out above, however, such units suffer from the disadvantage that over a period of time the tape of cassettes which are used in them will leave residue on the tape-engaging surface 10a of the magnetic head 10, and on the circumferential surface of the layer or coating 9a of the capstan roller 9, with the attendant difficulties that have been outlined.

To obtain a removal of these deposits, the cleaning device according to the present invention is provided. This cleaning device is illustrated in FIG. 2 wherein reference numeral 20 identifies one section of a cassette housing, the other section of which (in FIG. 2 the upper one) has been removed for the sake of illustration. The two sections of the housing 20 are connected together by means of pins 21, by screws or in any other desired manner. The housing 20 is identical with the housing of a tape cassette of the type that is normally used in the unit 1, in that it has holes 21a through which the spindle 6 can extend (the spindle 6 will extend through one or the other of these holes depending upon the orientation of the housing 20), and holes 22 into which the drive spindles 4 of the tape drive of the unit 1 extend. In the interior of the housing sections of the housing 20 the holes 22 are surrounded by inwardly projecting annular rims 23 on which rotating hubs 24 are supported. Normal tape cassettes have two of these hubs 24, each provided with inwardly projecting teeth 25 engaging in appropriate recesses on the drive spindles 4. In the present invention, however, only one such hub 24 is required, as illustrated, and the hub 24 that is used in the device according to the present invention is formed with a cam portion 26. Such hubs 24 are normally of synthetic plastic material and the cam portion 26 may be of one piece with the hub 24, or it could be a separate portion that is appropriately secured to the hub 24, for instance an appropriately shaped strip of metal or the like. In any case it is evident that when the hub 24 rotates, being driven by its cooperating spindle 4, the cam portion 26 will similarly rotate. The right-hand spindle 4 (in FIG. 1) is the one which is intended to cooperate with the hub 24, it is the one that is driven by the non-illustrated drive of the unit 1 when the unit is in either "record" or "playback" mode. This spindle 4, and consequently the hub 24, will always rotate in counterclockwise direction.

A cam follower 27 cooperates with the hub 24 and cam 26 and has two arms 28 and 29 which extend at an angle to one another, as illustrated. Cam follower 27 is mounted pivotably about an axis or pin 30 and has a portion 31 which projects to the open side of the housing 20. The portion 31 is provided with a wiping surface or else is provided with a layer 31a of wiping material, such as felt, velvet or the like, and it will be appreciated that when the cam 26 turns in counterclockwise direction, it will cause the cam follower 27 to turn about the pin 30 since it will first engage the arm 28 and displace the cam follower 27 in counterclockwise direction whereupon it will come in contact with the arm 29 and displace the cam follower 27 in clockwise direction, only to reverse the movement again. This causes a to-and-fro oscillation of the portion 31 and thus the layer 31a, which is in contact with the surface 10a of the head 10 when the housing 20 is inserted into the unit 1 in lieu of a tape cassette and the head 10 is in the solid-line position thereof, will wipe over the surface 10a and remove contaminants thereon.

To clean the peripheral surface of the capstan roller 9, there is provided a cleaning pad 32 which is also mounted in the housing 20 so as to have a portion located in or perhaps slightly projecting beyond the open side of the housing. The cleaning pad 32 is of an appropriate material which is somewhat resiliently yieldable when engaged by the capstan roller 9. The latter is of course driven in rotation by the drive of the unit 1 as is well known and requires no illustration. Thus, when the capstan roller is in its full-line position in FIG. 1, it will be in contact with the surface of the pad 32 which may be of a synthetic plastic foam material, of velvet, or any other suitable material, and when the capstan roller 9 rotates its surface will be wiped and cleaned of residue by the pad 32.

The most effective cleaning action is obtained if, as is generally contemplated, a cleaning fluid is used, such as isopropyl alcohol or some other analogous cleaning fluid. Such fluid is applied to the pad 31a and 32 before the device according to the present invention is used, and helps to dissolve any grease or other residue on the surface 10a and the capstan roller 9.

A final cleaning and drawing of the capstan roller 32 can be obtained if further cleaning pad 33 is also mounted in the housing 20, but in the region of an end portion remote from the cleaning pad 32. It is well known that tape cassettes can be turned upside down and can then be inserted in this position into the unit 1, as well as in the right-side up position. The same can be done with the device according to the present invention, in which case the hole 22 which is the left-hand one in FIG. 2, will now receive the spindle 4 which is the right-hand one in FIG. 1. This means that the cleaning pad 33 will be located opposite the capstan roller 9 and when the unit is placed in "recording" or "playback" mode so that the capstan roller 9 moves to the full-line position thereof and begins to rotate, the periphery of the capstan roller will now be wiped by the material of the cleaning pad 33. The initial cleaning operation, prior to turning-over of the housing 20, requires on the order of 10 to 15 seconds, which is very brief. After turning over of the housing 20, the unit 1 is allowed to operate for a few more seconds until the periphery of the capstan roller 9 has been thoroughly wiped by the cleaning pad 33. The latter is preferably of a finer-surface texture material than the cleaning pad 32, and it is again possible to use synthetic plastic material for the pad 33, velvet, cotton or the like. Evidently, the pad 33 must also be slightly resiliently compressible.

It is clear that with the arrangement of the present invention the entire cleaning operation for the head 10 and the capstan roller 9 can be carried out in mere seconds and involves absolutely no skill at all. Any one who can operate the unit 1 and insert and remove a normal tape cassette can also clean the unit with the use of the novel device. Thus, the difficulties of the prior art in terms of complexity of the cleaning arrangement, and difficulty in their use, have been overcome and a novel cleaning device has been provided which is simple, highly efficient and so easy to use that it will be frequently employed and thus aid in maintaining proper operation of the unit 1.

It will be understood that each of the elements described above, or two or more together, may also find a useful application in other types of constructions differing from the types described above.

While the invention has been illustrated and described as embodied in a device for cleaning the magnetic head and driven capstan roller of a cassette-type tape recording and/or playback unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that from the standpoint of prior art fairly constitute essential characteristics of the generic or specific aspects of this invention.

What is claimed as new and desired to be protected by Letters Patent is:

1. A device for cleaning the magnetic head and driven capstan roller of a cassette-type recording and/or playback unit having a tape drive, comprising a cassette housing having an open side which faces said head and capstan roller when said housing is placed in operative position on said unit in lieu of a tape cassette, said housing further having a hub rotatable by said drive; first means for wiping the periphery of said capstan roller in response to rotation of the latter; and second means for wiping a tape-engaging surface of said magnetic head and including a cam rotated by said hub and a cam follower which is alternately moved to and fro relative to said open side by said rotated cam.

2. A device as defined in claim 1, wherein said first means comprises a resilient cleaning pad mounted in said housing and in part located at said open side for engagement with said periphery of said capstan roller.

3. A device as defined in claim 2, wherein said resilient cleaning pad is located in one end region of said housing, and wherein said housing can be placed on said unit in two positions in which said one end region and an opposite end region of said housing are respectively located opposite said capstan roller; and wherein said first means includes an additional resilient cleaning pad mounted in said housing at said opposite end region thereof.

4. A device as defined in claim 3, wherein one of said cleaning pads has a finer surface texture than the other cleaning pad and serves for final wiping of said periphery of the capstan roller.

5. A device as defined in claim 1, wherein said second means has a cleaning portion located at said open side for engagement with said tape-engaging surface of said head, said cleaning portion performing a to-and-fro wiping motion in response to engagement of said cam follower with the rotating cam.

6. A device as defined in claim 5, wherein said cam follower is a member mounted for pivoting movement about a pivot axis inwardly of said open side and parallelling the axis of rotation of said cam, said member having two arms which include with one another an angle and which are sequentially engaged by the rotating cam so that said member pivots alternately in clockwise and in counter-clockwise direction.

7. A device as defined in claim 6, wherein said cleaning portion is provided with a cleaning pad which engages and wipes over said tape-engaging surface of said head.

* * * * *

UNITED STATES PATENT AND TRADEMARK OFFICE
CERTIFICATE OF CORRECTION

PATENT NO. : 3,955,214
DATED : May 4, 1976
INVENTOR(S) : Herman D. Post, Jack Friedland, Art Seides and George Alexandrovich, Sr.

It is certified that error appears in the above-identified patent and that said Letters Patent are hereby corrected as shown below:

[73] The name of the Assignee should read

Robins Industries Corporation

Signed and Sealed this

Twenty-seventh Day of July 1976

[SEAL]

Attest:

RUTH C. MASON
*Attesting Officer*

C. MARSHALL DANN
*Commissioner of Patents and Trademarks*